J. K. BULGER.
LOCK JOINT COUPLING.
APPLICATION FILED NOV. 16, 1909.

958,086.

Patented May 17, 1910.

Witnesses:
Arthur L. Slee
S. Constine

Inventor:
John King Bulger
by Wm. F. Booth
his Attorney.

UNITED STATES PATENT OFFICE.

JOHN KING BULGER, OF SAN FRANCISCO, CALIFORNIA, ASSIGNOR TO THE BULGER LOCK-COUPLING COMPANY, OF SAN FRANCISCO, CALIFORNIA, A CORPORATION OF CALIFORNIA.

LOCK-JOINT COUPLING.

958,086. Specification of Letters Patent. Patented May 17, 1910.

Application filed November 16, 1909. Serial No. 528,425.

*To all whom it may concern:*

Be it known that I, JOHN KING BULGER, a citizen of the United States, residing in the city and county of San Francisco and State of California, have invented certain new and useful Improvements in Lock-Joint Couplings, of which the following is a specification.

My invention relates to the class of couplings. It is especially adapted for pipes, hose and flanges generally; and particularly where such couplings are required in fire departments, on oil cars, gasolene wagons, dredgers, etc., and in all situations in which pipes, or hose, or sleeves or flanges have to be coupled to make steam, water, oil, air or other fluid joints.

The object of my invention is to provide a tight lock-joint, simple in construction and readily operatable.

To this end my invention consists in the novel lock-joint coupling which I shall now describe by reference to the accompanying drawings in which—

Figure 1:
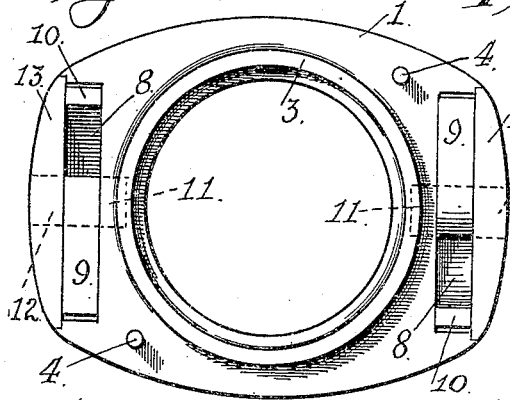
Figure 2:
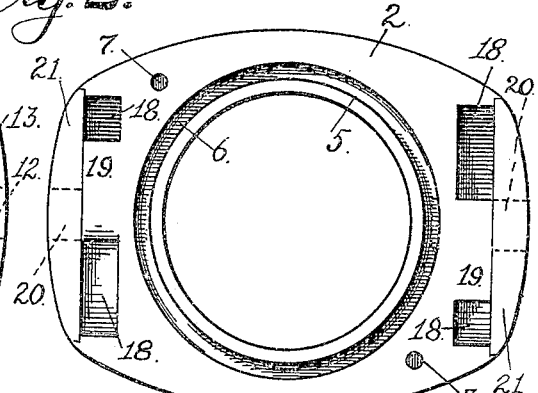
Figure 3:
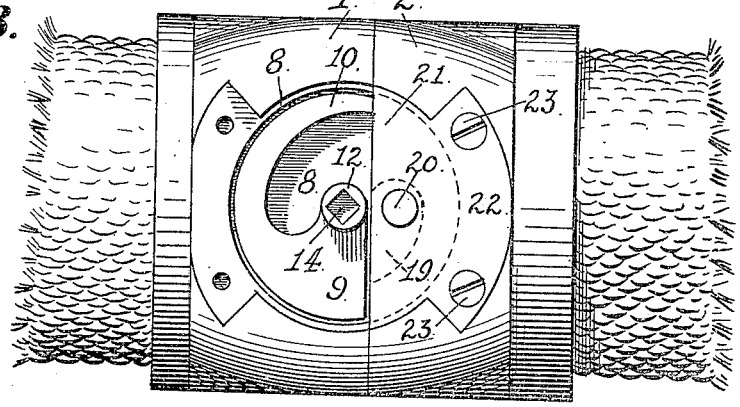
Figure 4:
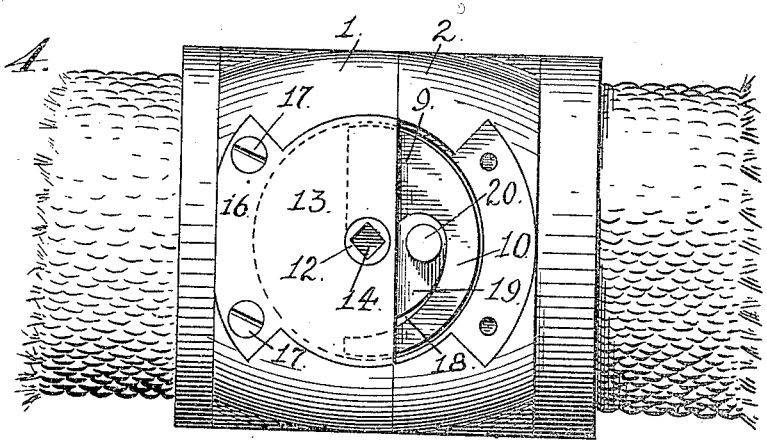
Figure 5:
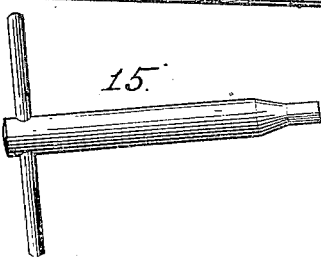

Figure 1 is a face view of the male coupling member. Fig. 2 is a face view of the female coupling member. Fig. 3 is a side view showing the coupling members fitted together but not locked, the cover on one member being removed. Fig. 4 is a similar view, showing the coupling locked, the cover on the other member being removed. Fig. 5 is a view of the lock-operating key.

The coupling members 1 and 2 are faced to a ground joint, the male coupling 1, as seen in Fig. 1, having an annular rib 3 and guide studs 4, and the female coupling 2, as shown in Fig. 2, having an annular groove 5 with a suitable gasket or washer 6 to form a seat for the rib 3, and sockets 7 to receive the studs 4.

In the outer wall of one side of the coupling member 1 is made a curved recess 8 which intersects the face of the member. In this recess is seated the rotatable plate 9, the periphery of which is circular. This plate is formed with the locking cam-tongue 10. The plate 9 has a boss 11, seen in dotted lines in Fig. 1, on its inner face, which boss pivotally seats in a socket in the floor of the recess 8. The plate has also on its outer face a key-receiving boss 12 which is pivotally seated in a cover 13, secured over the recess 8. The boss 12 has a socket 14 to receive a key 15, such as is shown in Fig. 5, by which the plate is turned on its axis. The cover 13 is best formed with a dove-tailed extension 16 which seats in a corresponding depression in the coupling member 1, and receives screws 17 to hold it. The plate 9 is thus securely housed.

The coupling member 2 is formed on one side with a curved recess 18 which is the complement of the recess 8 in member 1. In this recess 18 is a fixed lug 19. From this lug projects a boss 20 which is received in a cover 21 over the recess 18, said cover having a dove-tailed extension 22 fitting in a corresponding depression in the member 2 and receiving screws 23 for holding the cover. The lug 19 is thus housed in and forms in the recess 18 in the wall of member 2, the proper groove or way to receive the cam-tongue 10, which engages said lug. The opposite side of the coupling member 1 is formed and provided with a locking cam similar to and symmetrical with that heretofore described; and the opposite side of the coupling member 2 is formed and provided with a receiving groove and lug similar to and symmetrical with those hitherto mentioned, but these parts on one side are relatively reversed to those on the other side, as indicated in Figs. 1 and 2, so that no matter which side of the members 1 and 2 is presented to the other, the interlocking parts will fit; that is to say, they are interchangeable in function and operation.

To effect the coupling, the members are brought together, so that the rib 3 will fit in the groove 5 and seat against the gasket 6, and the studs 4 will fit the sockets 7. Then, with the key 15, the plate 9 is turned so that its cam-tongue 10, entering the groove or way in recess 18, will pass behind and engage the fixed lug 19 and thereby draw and hold the members together in a tight, locked joint, the cam-tongue 10 finally embracing the lug and coming to rest at the limit of its movement. To uncouple, the plate 9 is turned back, and upon the withdrawal of its tongue from the recess 18, the limit of movement is reached by the base of the cam abutting against the face of the lug 19 and the face of the member 2.

Having thus described my invention, what I claim as new and desire to secure by Letters Patent is—

1. A lock-joint coupling comprising complemental coupling members between the meeting faces of which a joint is effected; a rotatable cam-tongue housed within the wall of one member and operatable from the exterior to be projected from the face of said member; and a fixed lug housed within the wall of the other member, said lug being shaped and disposed to receive the engagement of the cam-tongue, to draw and lock said members together.

2. A lock-joint coupling comprising opposing coupling members, one of said members having on its face an annular rib and the other having in its face an annular groove with seated gasket, to receive the rib of the first member, whereby a joint is formed between the faces of said members; a rotatable cam-tongue housed within the wall of one member and operatable from the exterior to be projected from the face of said member; and a fixed lug housed within the wall of the other member, said lug being shaped and disposed to receive the engagement of the cam-tongue, to draw and lock said members together.

3. A lock-joint coupling comprising complemental coupling members between the meeting faces of which a joint is effected; relatively reversed, symmetrical, rotatable cam-tongues housed within diametrically opposed walls of one member and each operatable from the exterior to be projected from the face of said member; and relatively reversed, symmetrical, fixed lugs housed within diametrically opposed walls of the other member, said lugs being shaped and disposed to receive interchangeably the engagement of the cam-tongues, to draw and lock said members together.

4. A lock-joint coupling comprising opposing coupling members, one of said members having on its face an annular rib, and the other having in its face an annular groove with seated gasket, to receive the rib of the first member, whereby a joint is formed between the faces of said members; relatively reversed, symmetrical, rotatable cam-tongues housed within diametrically opposed walls of one member and each operatable from the exterior to be projected from the face of said member; and relatively reversed, symmetrical, fixed lugs housed within diametrically opposed walls of the other member, said lugs being shaped and disposed to receive interchangeably the engagement of the cam-tongues, to draw and lock said members together.

5. A lock-joint coupling comprising complemental coupling members between the faces of which a joint is effected, one of said members having formed in its outer wall a recess intersecting the face of said member, and a removable cover for said recess, and the other member having formed in its outer wall a recess intersecting the face of said member, and a removable cover for said recess; a cam-tongue mounted in the recess of the first member and pivoted between the floor of said recess and the cover thereof, its pivot being exposed to the exterior of the cover and fashioned to receive a key whereby the cam-tongue may be turned to be projected from the face of said member; and a fixed lug in the recess of the second member between the floor of said recess and its cover, said lug being shaped and disposed to receive behind it the engagement of the cam-tongue, to draw and lock said members together.

6. A lock-joint coupling comprising opposing coupling members having their faces fashioned with an annular male and female joint connection, one of said members having formed in diametrically opposite walls recesses intersecting the face of said member, and a removable cover for said recesses, and the other member having formed in diametrically opposite walls recesses intersecting the face of said member, and a removable cover for said recesses; a cam-tongue mounted in each recess of the first member and pivoted between the floor of said recess and the cover thereof, its pivot being exposed to the exterior of the cover and fashioned to receive a key whereby the cam-tongue may be turned to be projected from the face of said member, the cam-tongue in one recess being symmetrical with but relatively reversed to the cam-tongue in the other recess; and a fixed lug in each recess of the second member, between the floor of said recess and its cover, the lug in one recess being symmetrical with but relatively reversed to the lug in the other recess, said lugs being shaped and disposed to receive behind them the engagement of the cam-tongues, to draw and lock said members together.

In testimony whereof I have signed my name to this specification in the presence of two subscribing witnesses.

JOHN KING BULGER.

Witnesses:
A. K. DAGGETT,
WM. F. BOOTH.